United States Patent
Cao

(10) Patent No.: US 11,137,897 B2
(45) Date of Patent: Oct. 5, 2021

(54) METHOD AND DEVICE FOR INTELLIGENTLY RECOGNIZING GESTURE-BASED ZOOM INSTRUCTION BY BROWSER

(71) Applicant: ZTE CORPORATION, Guangdong (CN)

(72) Inventor: Gang Cao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 670 days.

(21) Appl. No.: 16/071,301

(22) PCT Filed: Jan. 9, 2017

(86) PCT No.: PCT/CN2017/070626
§ 371 (c)(1),
(2) Date: Jul. 19, 2018

(87) PCT Pub. No.: WO2017/124931
PCT Pub. Date: Jul. 27, 2017

(65) Prior Publication Data
US 2021/0208774 A1 Jul. 8, 2021

(30) Foreign Application Priority Data
Jan. 19, 2016 (CN) .......................... 201610032862.1

(51) Int. Cl.
*G06F 3/0488* (2013.01)
*G06F 9/451* (2018.01)
(Continued)

(52) U.S. Cl.
CPC ...... *G06F 3/04883* (2013.01); *G06F 3/04845* (2013.01); *G06F 9/451* (2018.02); *G06K 9/00335* (2013.01)

(58) Field of Classification Search
CPC .. G06F 3/04883; G06F 3/04845; G06F 9/451; G06K 9/00335
See application file for complete search history.

(56) References Cited

U.S. PATENT DOCUMENTS

| | | | |
|---|---|---|---|
| 8,775,923 B1 * | 7/2014 | Kroeger | G06F 16/9574 715/234 |
| 9,552,067 B2 * | 1/2017 | Smith | G06F 3/04883 |

(Continued)

FOREIGN PATENT DOCUMENTS

| | | |
|---|---|---|
| CN | 102262529 A | 11/2011 |
| CN | 102436343 A | 5/2012 |

(Continued)

OTHER PUBLICATIONS

WIPO, International Search Report dated Apr. 11, 2017.
China Patent Office, First Office Action dated Sep. 27, 2020 for application No. CN201610032862.1.

*Primary Examiner* — Tadesse Hailu
(74) *Attorney, Agent, or Firm* — Vivacqua Crane

(57) ABSTRACT

A method and a device for implementation of a browser for intelligently recognizing a gesture-based zoom instruction are provided, relating to the browser technologies. The method includes: detecting, by a mobile terminal, a gesture-based instruction input by a user (S101); finding a web page element associated with a position of a touch point of the gesture-based zoom instruction if the detected gesture-based instruction is a gesture-based zoom instruction for zooming a browser page (S102); and performing a corresponding operation according to the web page element (S103). The method and the device determine, according to the web page element associated with the position of the touch point, whether to perform a zoom operation of the browser page or a re-layout operation of a text region, being capable of improving the user experience.

8 Claims, 2 Drawing Sheets

(51) Int. Cl.
*G06F 3/0484* (2013.01)
*G06K 9/00* (2006.01)

(56) References Cited

U.S. PATENT DOCUMENTS

| | | | | |
|---|---|---|---|---|
| 9,740,393 | B2* | 8/2017 | Eldawy | G06F 3/0488 |
| 2006/0005114 | A1* | 1/2006 | Williamson | G06F 40/143 |
| | | | | 715/211 |
| 2007/0185904 | A1* | 8/2007 | Matsuzawa | G06F 16/9024 |
| 2009/0083661 | A1* | 3/2009 | Blinnikka | G06F 16/9577 |
| | | | | 715/787 |
| 2010/0156806 | A1 | 6/2010 | Stallings | |
| 2013/0290847 | A1* | 10/2013 | Hooven | G06F 16/957 |
| | | | | 715/719 |
| 2013/0346913 | A1* | 12/2013 | Smith | G06F 3/017 |
| | | | | 715/784 |
| 2014/0047413 | A1* | 2/2014 | Shelve | G06F 8/30 |
| | | | | 717/110 |
| 2014/0372870 | A1* | 12/2014 | Chen | G06F 3/0484 |
| | | | | 715/234 |
| 2015/0186340 | A1 | 7/2015 | Liu et al. | |
| 2015/0269271 | A1 | 9/2015 | Liu et al. | |
| 2015/0362998 | A1* | 12/2015 | Park | G06F 3/0346 |
| | | | | 345/173 |
| 2016/0026730 | A1* | 1/2016 | Hasan | G06F 40/143 |
| | | | | 715/234 |
| 2016/0334974 | A1* | 11/2016 | Gray | G06F 3/0482 |
| 2017/0161240 | A1* | 6/2017 | Lee | G06F 40/123 |
| 2020/0192731 | A1* | 6/2020 | Dong | G06F 8/61 |

FOREIGN PATENT DOCUMENTS

| | | |
|---|---|---|
| CN | 102637198 A | 8/2012 |
| CN | 103440104 A | 12/2013 |
| CN | 103544155 A | 1/2014 |
| CN | 103713844 A | 4/2014 |
| CN | 103870508 A | 6/2014 |
| CN | 104239326 A | 12/2014 |
| CN | 104965881 A | 10/2015 |

* cited by examiner

METHOD AND DEVICE FOR INTELLIGENTLY RECOGNIZING GESTURE-BASED ZOOM INSTRUCTION BY BROWSER

TECHNICAL FIELD

The present disclosure relates to browser technologies, and particularly, to a method and a device for implementation of a browser for intelligently recognizing a gesture-based zoom instruction.

BACKGROUND

Frequently, a browser executed on a touch screen of a mobile terminal needs to recognize operation sequence of touch and click (e.g., touch start, touch move, touch end, etc.) that is performed by a user on a web page. The operation sequence of touch and click is recognized as a gesture-based operation instruction (such as swipe, hold, double-tap, pinch-out and pinch-in) based on characteristics such as a number of touch points and a touch time, where the recognized gesture-based operation instructions of double-tap, pinch-out and pinch-in are directly used as zoom instructions to perform zoom operations on the web page.

However, this monotonous gesture-based zoom operation for browser web pages may cause some problems under certain scenarios.

1. When a user plays a game on a HTML 5 game web page, the user needs to frequently tap some objects on the web page. This is often recognized as a double-tap gesture, and a zoom-in or zoom-out operation of the web page is unnecessarily and frequently performed, thereby disturbing user's gaming experience.

2. When a user performs a zoom operation on a browser web page, a re-layout of a text region is performed to adaptively match a width of a window of the mobile terminal. However, when the user performs a zoom operation on a non-text region of the web page, this re-layout operation often causes a series of operations on the web page, such as re-layout, re-drawing, coordinate adjustment, etc., thereby causing disturbance on user's vision and lowering user's experience.

With respect to these problems, effective solutions have not been proposed in existing art.

SUMMARY

Embodiments of the present disclosure provide a method and a device for implementation of a browser for intelligently recognizing a gesture-based zoom instruction, in order to at least avoid unnecessary zoom or re-layout of a browser web page.

According to an embodiment of the present disclosure, there is provided a method for implementation of a browser for intelligently recognizing a gesture-based zoom instruction. The method includes steps of: detecting, by a mobile terminal, a gesture-based instruction input by a user; finding a web page element associated with a position of a touch point of the gesture-based zoom instruction if the detected gesture-based instruction is the gesture-based zoom instruction for zooming a browser page; and performing a corresponding operation according to the web page element.

Optionally, the web page element includes a canvas tag element associated with a game and a text tag element associated with a text.

Optionally, the step of performing the corresponding operation according to the web page element includes steps of: determining whether or not the web page element associated with the position of the touch point is the canvas tag element; and discarding the gesture-based zoom instruction if it is determined that the web page element associated with the position of the touch point is the canvas tag element.

Optionally, the step of performing the corresponding operation according to the web page element further includes steps of: sampling positions of four vertexes of a rectangle area centered on the position of the touch point if the web page element associated with the position of the touch point is not the canvas tag element, and finding web page elements corresponding to the sampled positions of the four vertexes, respectively; and performing a re-layout operation on a text region of the browser page if the found web page elements corresponding to the positions of the four vertexes are each a text tag element, and otherwise, performing a zoom operation on the browser page.

Optionally, the step of performing the corresponding operation according to the web page element includes steps of: determining whether or not the web page element associated with the position of the touch point is the text tag element; and performing a re-layout operation on a text region of the browser page if it is determined that the web page element associated with the position of the touch point is the text tag element, and otherwise, performing a zoom operation on the browser page.

According to another embodiment of the present disclosure, there is provided a device for implementation of a browser for intelligently recognizing a gesture-based zoom instruction. The device includes: a detecting module configured to detect a gesture-based instruction input to a mobile terminal by a user; an finding module configured to find a web page element associated with a position of a touch point of the gesture-based zoom instruction if the detected gesture-based instruction is a gesture-based zoom instruction for zooming a browser page; and a processing module configured to perform a corresponding operation according to the web page element.

Optionally, the web page element found by the finding module includes a canvas tag element associated with a game and a text tag element associated with a text.

Optionally, the processing module is configured to determine whether or not the web page element associated with the position of the touch point is the canvas tag element, and configured to discard the gesture-based zoom instruction if it is determined that the web page element associated with the position of the touch point is the canvas tag element Optionally, the processing module is configured to sample positions of four vertexes of a rectangle area centered on the position of the touch point if the web page element associated with the position of the touch point is not the canvas tag element, and find web page elements corresponding to the sampled positions of the four vertexes, respectively; and configured to perform a re-layout operation on a text region of the browser page if the found web page elements corresponding to the positions of the four vertexes are all text tag elements, and otherwise, perform a zoom operation on the browser page.

Optionally, the processing module is configured to determine whether or not the web page element associated with the position of the touch point is the text tag element, and configured to perform a re-layout operation on a text region of the browser page if it is determined that the web page element associated with the position of the touch point is the text tag element, and otherwise, perform a zoom operation on the browser page.

According to still another embodiment of the present disclosure, there is provided a storage medium. The storage medium is configured to store program codes for performing the following steps of: detecting, by a mobile terminal, a gesture-based instruction input by a user; finding a web page element associated with a position of a touch point of the gesture-based zoom instruction if the detected gesture-based instruction is a gesture-based zoom instruction for zooming a browser page; and performing a corresponding operation according to the web page element.

Compared to those in existing art, embodiments of the present disclosure have the beneficial effects as below.

The present disclosure determines, according to a web page element associated with a position of a touch point, whether to perform a zoom operation of a browser page or a re-layout operation of a text region, being capable of improving the user experience.

BRIEF DESCRIPTION OF DRAWINGS

The figures illustrated here are to provide a further understanding of the present disclosure and constitutes as a part of the specification. The exemplary embodiments of the present disclosure and the description thereof are for explaining the present disclosure, and are not for improperly limiting the present disclosure. In the figures.

DETAILED DESCRIPTION

Hereinafter, the present disclosure will be described in detail in conjunction with embodiments and with reference to the accompanying drawings. It should be noted that the embodiments of the present disclosure and features of the embodiments can be combined with each other without conflicting with each other.

It should be noted that the terms "first", "second" and so on in the specification, the claims and the above drawings of the present disclosure are used for distinguishing similar objects, and are not necessarily for describing specific sequences or orders.

Figure 1:
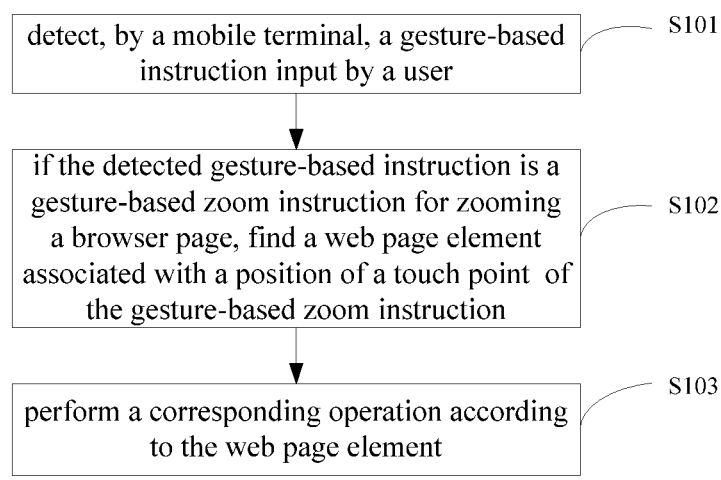
FIG. 1 is a schematic diagram illustrating a method for implementation of a browser for intelligently recognizing a gesture-based zoom instruction according to an embodiment of the present disclosure.

FIG. 1 is a schematic diagram illustrating a method for implementation of a browser for intelligently recognizing a gesture-based zoom instruction by a browser according to an embodiment of the present disclosure. As illustrated in FIG. 1, the method includes steps of S101 to S103.

At step S101, a mobile terminal detects a gesture-based instruction input by a user.

The mobile terminal recognizes a operation sequence of touch and click as an operation, such as swipe, hold, double-tap, pinch-out and pinch-in, based on characteristics such as a number of touch points and a touch time of the user's operation on a touch screen of the mobile terminal, where gesture-based instructions corresponding to operations such as double-tap, pinch-out and pinch-in are used as gesture-based zoom instructions for zooming a browser page.

At step S102, if the detected gesture-based instruction is a gesture-based zoom instruction for zooming a browser page, a web page element associated with a position of a touch point of the gesture-based zoom instruction is found.

The web page element includes a canvas tag element associated with a game and a text tag element associated with a text.

The mobile terminal finds the web page element associated with the position of the touch point by querying a Document Object Module (DOM) tree. Here, the web page element associated with the position of the touch point may include a web page element of a node corresponding to the position of the touch point, and may also include a web page element of a parent-node of the node corresponding to the position of the touch point.

At step S103, a corresponding operation is performed according to the web page element.

It is determined whether or not the web page element of the node or parent-node corresponding to the position of the touch point is the canvas tag element. If it is determined that the web page element is the canvas tag element, then the gesture-based zoom instruction is discarded. If neither the web page element of the node corresponding to the position of the touch point nor the web page element of the parent-node corresponding to the position of the touch point is the canvas tag element, then positions of four vertexes of a rectangle area centered on the position of the touch point are sampled, and web page elements corresponding to the sampled positions of the four vertexes are found, respectively. If the found web page elements corresponding to the positions of the four vertexes are all text tag elements, then a re-layout operation on a text region of the browser page is performed; and otherwise, merely a zoom operation is performed on the browser page, and no re-layout operation will be performed.

Alternatively, it is determined whether or not the web page element corresponding to the position of the touch point is the text tag element. If it is determined that the web page element is the text tag element, then a re-layout operation is performed on a text region of the browser page to adaptively match a width of a screen window of the mobile terminal; and otherwise, merely a zoom operation is performed on the browser page.

Here, with respect to a double-tap operation, an initial position of the user's operation on the touch screen may serve as the position of the touch point; and with respect to a pinch-out or pinch-in operation, average values may be taken from coordinates of two initial positions of the user's operation on the touch screen, and the obtained average values may serve as the position of the touch point.

Figure 2:
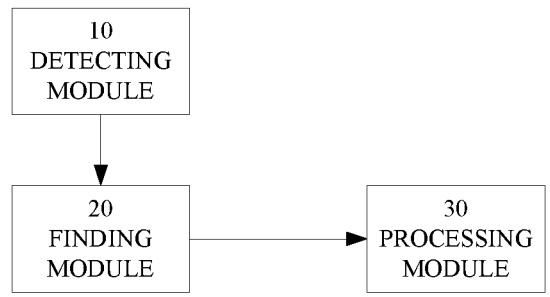
FIG. 2 is a block diagram illustrating a device for implementation of a browser for intelligently recognizing a gesture-based zoom instruction according to an embodiment of the present disclosure.

FIG. 2 is a block diagram illustrating a device for implementation of a browser for intelligently recognizing a gesture-based zoom instruction by a browser according to an embodiment of the present disclosure. As illustrated in FIG. 2, the device includes a detecting module 10, a finding module 20 and a processing module 30.

The detecting module 10 is configured to detect a gesture-based instruction input to a mobile terminal by a user.

The finding module 20 is configured to find a web page element associated with a position of a touch point of the gesture-based zoom instruction if the detected gesture-based instruction is a gesture-based zoom instruction for zooming a browser page. Here, the web page element includes a canvas tag element associated with a game and a text tag element associated with a text. The finding module 20 finds the web page element associated with the position of the touch point by querying a DOM tree. Here, the web page element associated with the position of the touch point may include a web page element of a node corresponding to the position of the touch point, and may also include a web page element of a parent-node of the node corresponding to the position of the touch point.

The processing module 30 is configured to perform a corresponding operation according to the web page element. Specifically, the processing module 30 determine whether or not the web page element of the node or parent-node corresponding to the position of the touch point is the canvas tag element; if it is determined that the web page element is the canvas tag element, then the gesture-based zoom instruction is discarded; if neither the web page element of the node corresponding to the position of the touch point nor the web page element of the parent-node corresponding to the position of the touch point is the canvas tag element, then positions of four vertexes of a rectangle area centered on the position of the touch point are sampled, and web page elements corresponding to the sampled positions of the four vertexes are found, respectively; if the found web page elements corresponding to the positions of the four vertexes are all text tag elements, then a re-layout operation on a text region of the browser page is performed; and otherwise, merely a zoom operation is performed on the browser page, and no re-layout operation will be performed. Alternatively, the processing module 30 is configured to determine whether or not the web page element corresponding to the position of the touch point is the text tag element; if it is determined that the web page element is the text tag element, then a re-layout operation is performed on a text region of the browser page to adaptively match a width of a screen window of the mobile terminal; and otherwise, merely a zoom operation is performed on the browser page.

Figure 3:
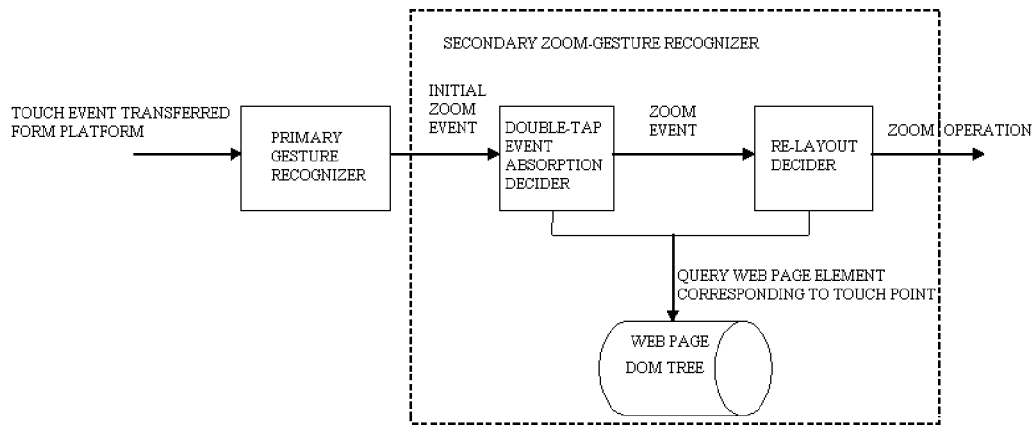
FIG. 3 is a general structural diagram for implementation of a browser for intelligently recognizing a gesture-based zoom instruction according to an embodiment of the present disclosure.

FIG. 3 is a general structural diagram for implementation of a browser for intelligently recognizing a gesture-based zoom instruction according to an embodiment of the present disclosure. As illustrated in FIG. 3, the browser mainly includes a primary gesture recognizer, and a secondary zoom-gesture recognizer consisting of a double-tap event absorption decider, a re-layout decider and a DOM tree, where the primary gesture recognizer implements functions of the detecting module in FIG. 2, and each of the double-tap event absorption decider and the re-layout decider may implement functions of the finding module 20 and partial functions of the processing module 30 in FIG. 2.

The primary gesture recognizer is configured to recognize, with a conventional method, the touch event sequence as a candidate gesture-based instruction, such as double-tap, pinch-out and pinch-in.

The double-tap event absorption decider is configured to determine whether to absorb (i.e., does not process) a double-tap event under a scenario.

The re-layout decider is configured to decide whether to re-layout a text region according to a width of a screen window of a mobile terminal.

The DOM tree provides determining criteria for tag elements to these two deciders.

The primary gesture recognizer detects a touch event transferred from a platform, and if the detected touch event is an initial zoom event, then it is transferred to the secondary zoom-gesture recognizer for further determination. That is to say, when the primary gesture recognizer initially determines a zoom event from a detected and recognized gesture such as double-tap, pinch-out and pinch-in, the primary gesture recognizer transfers the initial zoom event to the secondary zoom-gesture recognizer. The double-tap event absorption decider of the second zoon-gesture recognizer queries, in the DOM tree, whether or not a webpage element corresponding to a position of a touch point is a canvas tag element, and if it is the canvas tag element, then the double-tap event absorption decider absorbs the initial zoom event, and otherwise, the double-tap event absorption decider determines the initial zoom event as a zoom event and transfers the zoom event to the re-layout decider of the secondary zoom-gesture recognizer. The re-layout decider queries, in the BOOM tree, whether or not the web page element corresponding to the position of the touch point is a text tag element, and if it is the text tag element, then a zoom of the browser page is performed while a re-layout operation on the text region is performed, and otherwise, merely a zoom of the browser page is performed.

Figure 4:
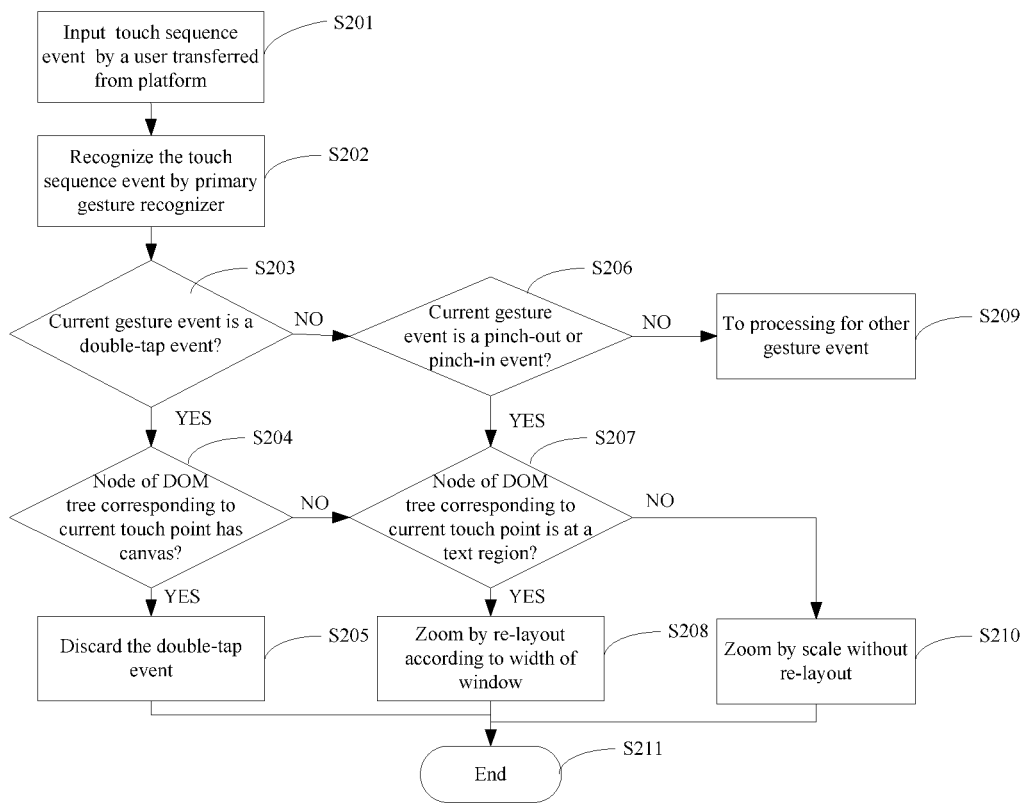
FIG. 4 is a flowchart illustrating a process of recognizing a zoom gesture on a web page according to an embodiment of the present disclosure.

FIG. 4 is a flowchart illustrating a process of recognizing a zoom gesture on a web page according to an embodiment of the present disclosure. As illustrated in FIG. 4, the process includes steps of S201 to S211.

At step S201, a browser receives a touch event sequence input by a user (e.g., touch start, touch move, touch end).

At step S202, the browser calls a primary gesture recognizer to recognize the touch event sequence to obtain a recognized candidate gesture-based instruction. This step is same with that of a conventional recognition method, and will not be described here in detail.

At step S203, it is determined whether or not the current gesture event (i.e., the recognized candidate gesture-based instruction) is a double-tap event, and if it is a double-tap event, then the process proceeds to step S204 for processing by a double-tap event absorption decider, and otherwise, the process proceeds to step S206.

At step S204, the double-tap event absorption decider queries, in a DOM tree, a web page element of a corresponding node based on coordinates of a position of a touch point of the double-tap, and determines whether or not the web page element of the node or its parent-node is a canvas tag element, and if it is the canvas tag element, then the process proceeds to step S205, and otherwise, the process proceeds to step S207 for processing by a re-layout decider.

At step S205, the found web page element of the node is the canvas tag element, thus the event is absorbed and no processing will be performed.

At step S206, it is determined whether or not the current gesture event (i.e., the recognized candidate gesture-based instruction) is a pinch-out or pinch-in event, and if it is the pinch-out or pinch-in event, then the process proceeds to step S207 for processing by the re-layout decider, and otherwise, the process proceeds to step S209.

At step S207, the re-layout decider determines whether or not the current touch position is at a large text region of the web page based on the coordinates of the position of the touch point of the gesture, and if it is, the process proceeds to step S208, and otherwise, the process proceeds to step S210.

In this step, whether or not the current touch position is at a large text region of the web page is specifically determined by the following steps of S2071 to S2073 (not illustrated in figures).

At step S2071, four points are sampled with the touch point (coordinates of the touch point are x, y on the screen)

being a centre, and coordinates of the four points being (x−M, y), (x+M, y), (x, y−M) and (x, y+M), respectively, where M may have a value of a quarter of a width of the screen.

At step S2072, respective tag types are queried in the DOM tree according to the coordinates of the above four sampling points.

At step S2073, if the tag types of the tag elements corresponding to these four sampling points are all text tag elements, then it is determined that this region is a large text region, and otherwise, this region would be determined as other region.

At step S208, the re-layout decider performs a re-layout operation on all text regions according to the width of the screen window of the mobile terminal.

At step S209, the current gesture event is transferred to another processing module that is not for the zoom event.

At step S210, the re-layout decider merely performs a zoom operation on the entire browser web page based on a zoom scale without performing the re-layout operation.

At step S211, the process is ended.

The present embodiment employs a secondary gesture determination based on a web page element corresponding to a position of a current touch point, in addition to the conventional recognition of touch and click gestures. That is, when a double-tap event or a pinch-out or pinch-in event is primarily determined and recognized, it is determined whether or not a node in a DOM tree corresponding to the position of the current touch point includes a canvas tag element associated with a game. If it includes the canvas tag element, then the zoom event is discarded, and otherwise, it is further determined whether or not the node in the DOM tree corresponding to the position of the current touch point of the double-tap event or the pinch-out or pinch-in event is a text tag element. If it is the text tag element, then a re-layout operation is performed such that the text adaptively matches the window, and otherwise, a smooth zoom operation is performed on the web page according to a zoom scale. By intelligently recognizing a gesture-based zoom instruction based on a web page element corresponding to a position of a touch point, it is possible to effectively avoid issues in the existing art, thereby improving the user experience.

In generally, embodiments of the present disclosure have the beneficial effects as below.

On basis of the primary gesture recognition, embodiments of the present disclosure introduces a secondary zoom-gesture recognition scheme based on tag information of a DOM tree where a position of a touch point is located, such that defects occurred under certain application scenarios in conventional gesture recognition methods can be avoided. For example, when a user double taps an object in a HTML5 game web page, the web page will no longer be unintentionally zoomed, and when a gesture-based zoom operation is performed on a non-text region, a vision disturbance caused by a re-layout of the non-text region will no longer occur, thereby greatly improving the user experience.

An embodiment of the present disclosure further provides a storage medium. Optionally, in an embodiment of the disclosure, the storage medium is configured to store program codes for performing the following steps of S101 to S103.

At step S101, a mobile terminal detects a gesture-based instruction input by a user.

At step S102, if the detected gesture-based instruction is a gesture-based zoom instruction for zooming a browser page, a web page element associated with a position of a touch point of the gesture-based zoom instruction is found.

At step S103, a corresponding operation is performed according to the web page element.

Optionally, the storage medium in the present embodiment may include, but is not limited to, a USB flash disk, a Read-Only Memory (ROM), a Random Access Memory (RAM), a removable hard disk drive, a magnetic disk or an optical disk, or other mediums that can store program codes.

Optionally, specific example of the present embodiment may refer to those in the embodiments and optional implementations as described above, which will not be described again herein.

Obviously, those skilled in the art should understand that those modules or steps of the present disclosure as described above can be implemented by using a general purpose computing device, which can be collectively provided in a single computing device or can be distributed across a network consisting of a plurality of computing devices, and optionally can be implemented by program codes that can be executed by a computing device. As such, those modules and steps can be stored in a storage device and executed by a computing device. In some cases, the steps illustrated or described herein can be executed in an order different from that as described herein, or can be implemented as respective integrated circuit modules, or a plurality of modules or steps among them can be implemented as a single integrated circuit module. As such, the present disclosure is not limited to any specific combination of hardware and software.

The foregoing implementations are merely exemplary embodiments of the present disclosure, and are not for limiting the present disclosure. For those skilled in the art, the present disclosure can have various modifications and variations. Any modifications, equivalents, improvements or the like should be contained within the protection scope of the present disclosure without departing from the spirit and principle of the present disclosure.

INDUSTRIAL APPLICABILITY

As described above, embodiments of the present disclosure provide a method and a device for implementation of a browser for intelligently recognizing a gesture-based zoom instruction by a browser and have the following beneficial effects: the present disclosure determines whether to perform a zoom operation of a browser page or a re-layout operation of a text region according to a web page element associated with a position of a touch point, being capable of improving the user experience.

What is claimed is:

1. A method for implementation of a browser for intelligently recognizing a gesture-based zoom instruction, comprising steps of:

detecting, by a mobile terminal, a gesture-based instruction input by a user;

finding a web page element associated with a position of a touch point of the gesture-based zoom instruction if the detected gesture-based instruction is the gesture-based zoom instruction for zooming a browser page; and performing a corresponding operation according to the web page element;

wherein the web page element comprises a canvas tag element associated with a game and a text tag element associated with a text;

wherein the step of performing the corresponding operation according to the web page element further comprises steps of:
- sampling positions of four vertexes of a rectangle area centered on the position of the touch point if the web page element associated with the position of the touch point is not the canvas tag element, and finding web page elements corresponding to the sampled positions of the four vertexes respectively; and
- performing a re-layout operation on a text region of the browser page if the found web page elements corresponding to the positions of the four vertexes are all text tag elements, and otherwise, performing a zoom operation on the browser page.

2. The method according to claim 1, wherein the step of performing the corresponding operation according to the web page element comprises steps of:
- determining whether or not the web page element associated with the position of the touch point is the canvas tag element; and
- discarding the gesture-based zoom instruction if it is determined that the web page element associated with the position of the touch point is the canvas tag element.

3. The method according to claim 2, wherein the step of performing the corresponding operation according to the web page element further comprises steps of:
- sampling positions of four vertexes of a rectangle area centered on the position of the touch point if the web page element associated with the position of the touch point is not the canvas tag element, and finding web page elements corresponding to the sampled positions of the four vertexes respectively; and
- performing a re-layout operation on a text region of the browser page if the found web page elements corresponding to the positions of the four vertexes are all text tag elements, and otherwise, performing a zoom operation on the browser page.

4. The method according to claim 1, wherein the step of performing the corresponding operation according to the web page element comprises steps of:
- determining whether or not the web page element associated with the position of the touch point is the text tag element; and
- performing a re-layout operation on a text region of the browser page if it is determined that the web page element associated with the position of the touch point is the text tag element, and otherwise, performing a zoom operation on the browser page.

5. A non-transitory storage medium configured to store a computer program for performing the method for implementation of a browser for intelligently recognizing a gesture-based zoom instruction according to claim 1.

6. A device for implementation of a browser for intelligently recognizing a gesture-based zoom instruction, comprising:
- a detecting module configured to detect a gesture-based instruction input to a mobile terminal by a user;
- a finding module configured to find a web page element associated with a position of a touch point of the gesture-based zoom instruction if the detected gesture-based instruction is the gesture-based zoom instruction for zooming a browser page; and
- a processing module configured to perform a corresponding operation according to the web page element;
- wherein the web page element found by the finding module comprises a canvas tag element associated with a game and a text tag element associated with a text;
- wherein the processing module is configured to sample positions of four vertexes of a rectangle area centered on the position of the touch point if the web page element associated with the position of the touch point is not the canvas tag element, and find web page elements corresponding to the sampled positions of the four vertexes respectively, and configured to perform a re-layout operation on a text region of the browser page if the found web page elements corresponding to the positions of the four vertexes are all text tag elements, and otherwise, perform a zoom operation on the browser page.

7. The device according to claim 6, wherein the processing module is configured to determine whether or not the web page element associated with the position of the touch point is the canvas tag element, and configured to discard the gesture-based zoom instruction if it is determined that the web page element associated with the position of the touch point is the canvas tag element.

8. The device according to claim 6, wherein the processing module is configured to determine whether or not the web page element associated with the position of the touch point is the text tag element, and configured to perform a re-layout operation on a text region of the browser page if it is determined that the web page element associated with the position of the touch point is the text tag element, and otherwise, perform a zoom operation on the browser page.

* * * * *